United States Patent
Cheng et al.

(10) Patent No.: US 9,811,761 B2
(45) Date of Patent: Nov. 7, 2017

(54) SYSTEM, METHOD, AND RECORDING MEDIUM FOR DETECTING VIDEO FACE CLUSTERING WITH INHERENT AND WEAK SUPERVISION

(71) Applicant: International Business Machines Corporation, Armonk, NY (US)

(72) Inventors: Yu Cheng, Ossining, NY (US); Sharathchandra U. Pankanti, Darien, CT (US); Nalini K. Ratha, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 14/839,424

(22) Filed: Aug. 28, 2015

(65) Prior Publication Data

US 2017/0061245 A1 Mar. 2, 2017

(51) Int. Cl.
*G06K 9/62* (2006.01)
*G06K 9/00* (2006.01)

(52) U.S. Cl.
CPC ....... *G06K 9/6218* (2013.01); *G06K 9/00288* (2013.01); *G06K 9/00295* (2013.01); *G06K 9/00718* (2013.01); *G06K 9/6264* (2013.01)

(58) Field of Classification Search
CPC .. G06F 17/30598; G06F 17/30705–17/30713; G06K 9/6218–9/6226
See application file for complete search history.

(56) References Cited

U.S. PATENT DOCUMENTS

| | | | |
|---|---|---|---|
| 7,508,990 B2 | 3/2009 | Pace | |
| 8,050,454 B2 | 11/2011 | Yi et al. | |
| 2009/0092283 A1 | 4/2009 | Whillock et al. | |
| 2013/0111509 A1* | 5/2013 | Guo | G06K 9/00677 725/12 |

(Continued)

OTHER PUBLICATIONS

Zhenguo Li et al., Pairwise Constraint Propagation by Semidefinite Programming for Semi-Supervised Classification, Appearing in Proceedings of the 25 th International Conference on Machine Learning, Helsinki, Finland, 2008, copyright 2008, 8 pages total.*

(Continued)

*Primary Examiner* — Brian P Werner
(74) *Attorney, Agent, or Firm* — Yeen Tham, Esq.; McGinn IP Law Group, PLLC (57) ABSTRACT

A face clustering system for video face clustering in a video sequence, the system including an inherent supervision summarization device configured to collect group-level supervision and instance level supervision within a same chunklet based on a user input of face images for a person, a discriminative projection learning device configured to embed group constraints of the group-level supervision into a transformed space, and configured to generate an embedding space from the original image feature space, and a clustering device, in the embedding space, configured to execute pair-wise based clustering to cluster the video images into different clusters with the instance level supervision collected by the inherent supervision summarization device.

19 Claims, 7 Drawing Sheets (56) References Cited

U.S. PATENT DOCUMENTS

2015/0086133 A1   3/2015   Grady et al.
2015/0089399 A1   3/2015   Megill et al.

OTHER PUBLICATIONS

Lipton, et al. A system for video surveillance and monitoring. vol. 2. Pittsburgh: Carnegie Mellon University, the Robotics Institute, 2000.
Hampapur, et al. "Smart video surveillance: exploring the concept of multiscale spatiotemporal tracking." Signal Processing Magazine, IEEE 22.2 (2005): 38-51.
Ko, "A survey on behavior analysis in video surveillance for homeland security applications." Applied Imagery Pattern Recognition Workshop, 2008. AIPR'08. 37$^{th}$ IEEE. IEEE, 2008.
Lin, et al. "Group event detection with a varying number of group members for video surveillance." Circuits and Systems for Video Technology, IEEE Transactions on 20.8 (2010): 1057-1067.
Zhang, et al. "A fast and robust people counting method in video surveillance." Computational Intelligence and Security, 2007 International Conference on. IEEE, 2007.

\* cited by examiner

FIG. 3 group-level constraint	instance-level constraint

SYSTEM, METHOD, AND RECORDING MEDIUM FOR DETECTING VIDEO FACE CLUSTERING WITH INHERENT AND WEAK SUPERVISION

This invention was made with Government support under Contract No.: H98230-11-C-0276 awarded by the Department of Defense (DoD). The Government has certain rights in this invention.

BACKGROUND

The present invention relates generally to image processing, and more particularly, but not by way of limitation, to a system, a method, and a recording medium including inputting a list of video images with different persons' faces and outputting a plurality of clusters, where each cluster contains the face image with the same person.

In a large media collection of people, many intelligent analyses can be made about all of the persons who are present and how they have interacted in the context of the collection. Automating these tasks is a challenge in conventional methods. Due to pose, occlusion or other artifacts (lighting, decoration, poor resolution, etc.), automating the clustering of the faces is a challenge while not knowing a priori the number of persons in the collection.

Face clustering is a task of grouping faces by visual similarity. It is closely related to face recognition, but has several different aspects. Most conventional data-driven methods are fully unsupervised, and focus on obtaining a good distance measure or mapping raw data to a new space for better representing the structure of the inter-personal dissimilarities from the unlabeled faces.

In the conventional methods of constrained clustering, many methods have been proposed to exploit pairwise constraints to guide the clustering. For example, one conventional method embeds constraints in hard manner, while other conventional methods adopt the soft constraints. However, the weights of these soft constraints are totally user-defined.

In conventional unsupervised learning tasks, it is much easier to obtain the data in "chunklets", without the need for labels. Each chunklet is a set in which the data comes from the same class but the actual class labels are not known. Such a scenario yields partial equivalence relations. There are some conventional approaches about the learning with partial equivalence relations. One of the algorithms for this purpose is Relevant Component Analysis (RCA). RCA is an effective linear-transformed algorithm used for data representation, which finds a linear transformation of the data such that irrelevant variability in the data is reduced. This "irrelevant variability" is estimated using chunklets. A non-linear extension of RCA called kernel RCA has been proposed in such conventional methods.

However, a major drawback of RCA, similar to Principal Component Analysis (PCA), is that the transformations of RCA are optimized for representation or compression of data in a group, but it is not good enough for class discrimination.

SUMMARY

In view of the foregoing and other problems, disadvantages, and drawbacks of the aforementioned background art, it is desirable to provide an improved way to perform video face clustering with inherent and weak supervision and to address the problem by proposing a method for discriminatively learning linear transformations using the chunklet data.

An exemplary aspect of the disclosed invention provides a system, method, and non-transitory recording medium for video face clustering with inherent and weak supervision.

In an exemplary embodiment, the present invention can provide a face clustering system for video face clustering in a video sequence, the system including an inherent supervision summarization device configured to collect group-level supervision and instance level supervision within a same chunklet based on a user input of face images for a person, a discriminative projection learning device configured to embed group constraints of the group-level supervision into a transformed space, and configured to generate an embedding space from the original image feature space, and a clustering device, in the embedding space, configured to execute pair-wise based clustering to cluster the video images into different clusters with the instance level supervision collected by the inherent supervision summarization device.

Further, in another exemplary embodiment, the present invention can provide a face clustering method for video face clustering in a video sequence, the method including extracting group constraints and pair-wise constraints from the video sequence, embedding the group constraints into a feature space while generating an embedding space from the original image feature space, and in the generated space, executing pair-wise based clustering to cluster the video images into different clusters.

Even further, in another exemplary embodiment, the present invention can provide a non-transitory computer-readable recording medium recording a face clustering detection program for video face clustering in a video sequence, the program causing a computer to perform extracting group constraints and pair-wise constraints from the video sequence, embedding the group constraints into a feature space while generating an embedding space from the original image feature space, and in the generated space, executing pair-wise based clustering to cluster the video images into different clusters.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

The invention will now be described with reference to FIGS. 1-8, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

For the purposes of this invention, a chunklet is a set in which data comes from a same class, but the actual class labels are not known. For example, a chunklet is a video sequence in which the same people are shown for a period of time. Then, a new chunklet is identified when the scene or image changes to include a different group of people.

Further, for purposed of this invention, weak and inherent supervision is Prior knowledge of labelling soft (i.e., not always true but mostly true) constraints used to help the classification/clustering task, which is automatically obtained from the data without human labelling.

Figure 1:
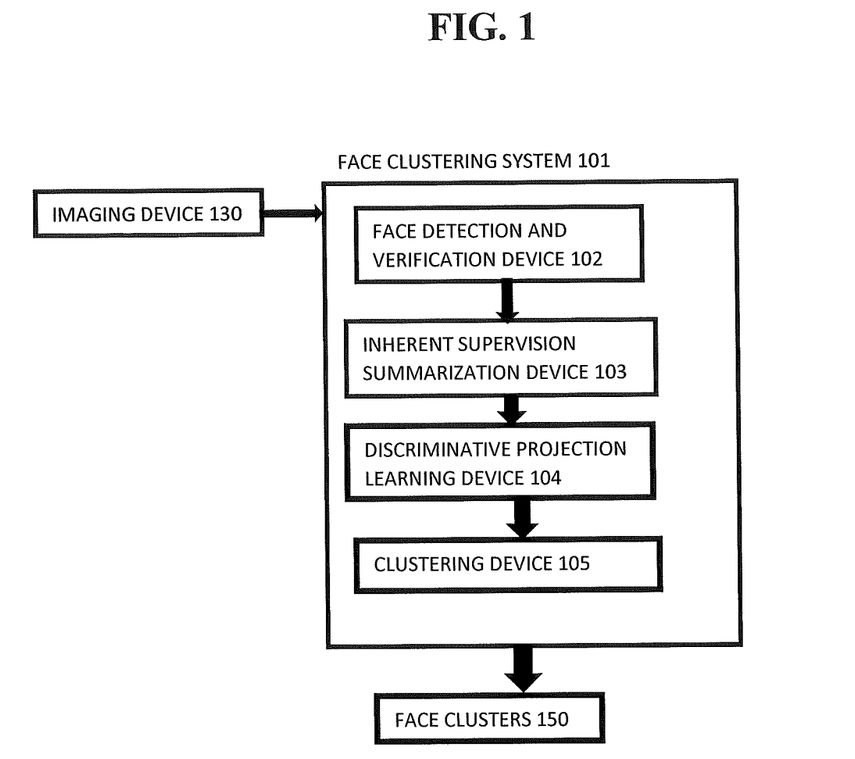
FIG. 1 exemplarily shows a block diagram illustrating a configuration of a clustering system for clustering faces in video frames.

With reference now to FIG. 1, the face clustering system 101 comprises a face detection and verification device 102, an inherent supervision summarization device 103, a discriminative projection learning device 104, and a clustering device 105. The face clustering system 101 receives a plurality of input videos from an imaging device 130. The face clustering system 101 includes a processor 180 and a memory 190, with the memory 190 storing instructions to cause the processor 180 to execute each device of the face clustering system 101.

Figure 6:
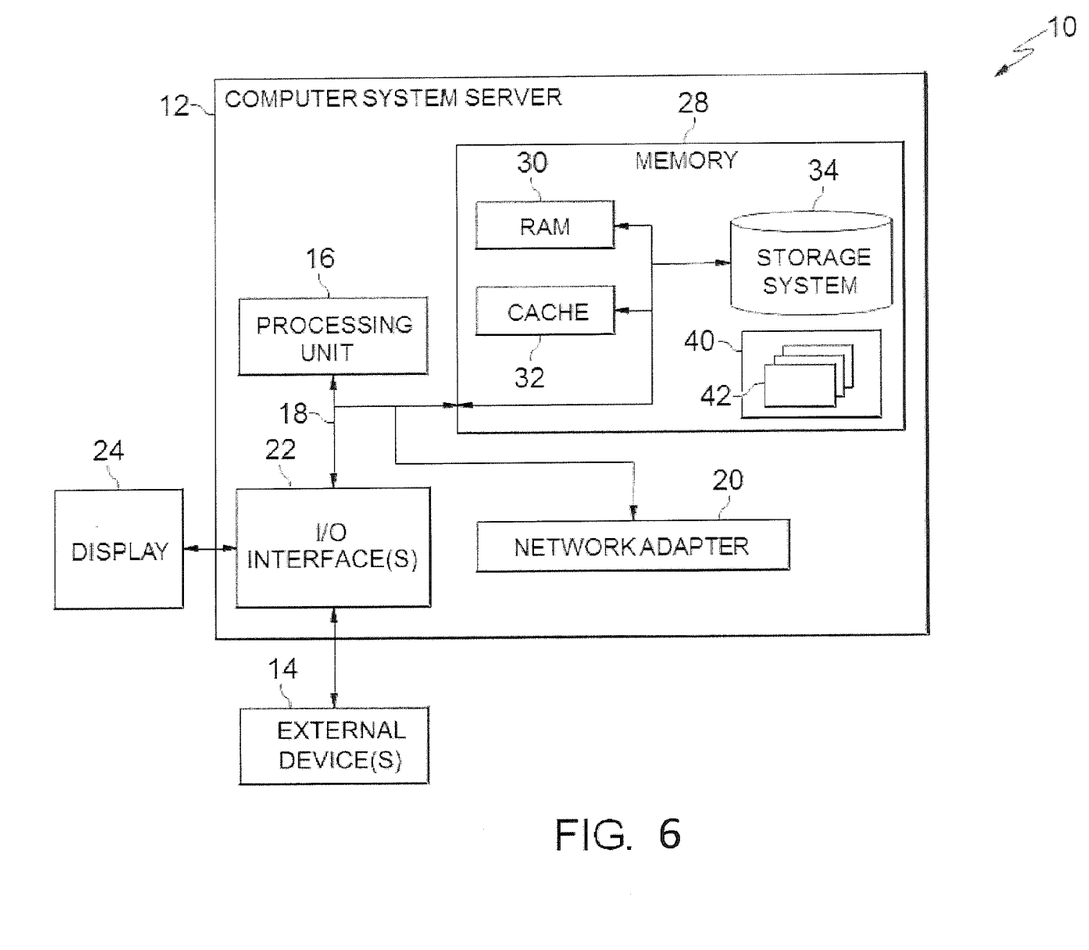
FIG. 6 depicts a cloud computing node according to an embodiment of the present invention.
Figure 7:
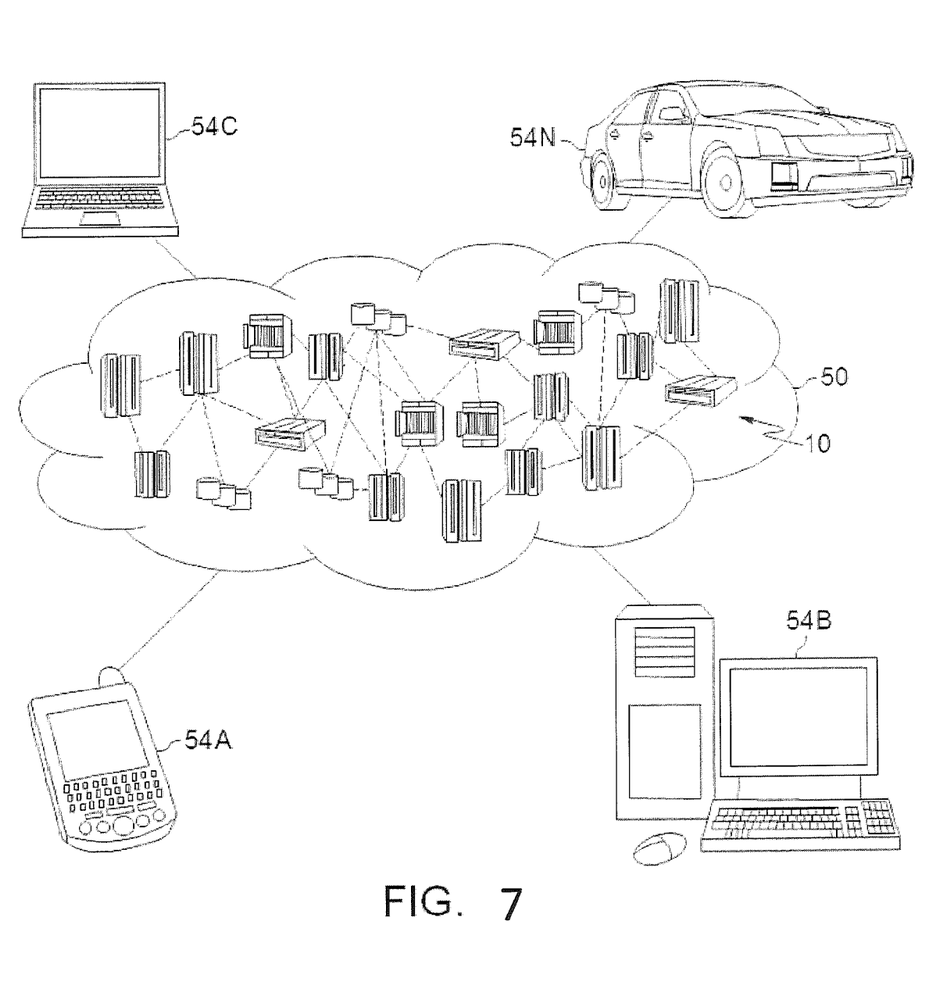
FIG. 7 depicts a cloud computing environment according to an embodiment of the present invention.
Figure 8:
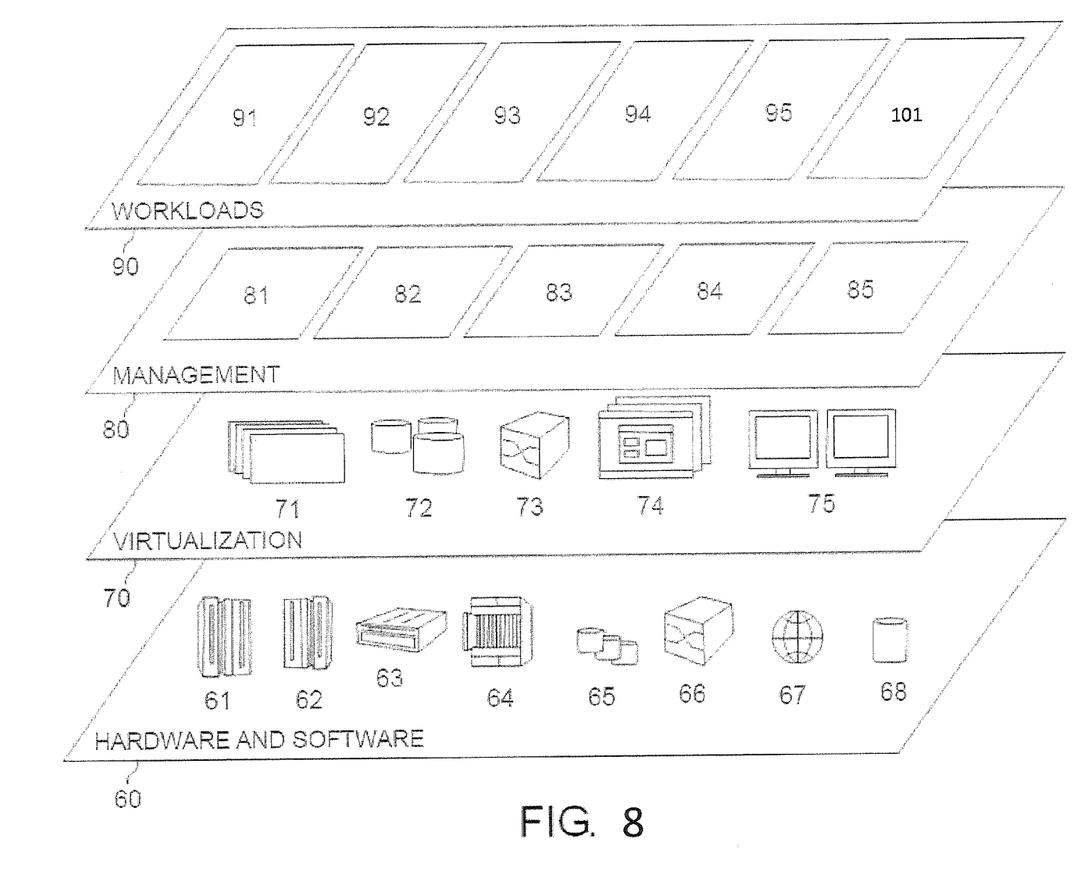
FIG. 8 depicts abstraction model layers according to an embodiment of the present invention.

Although as shown in FIGS. 6-8 and as described later, the computer system/server 12 is exemplarily shown in cloud computing node 10 as a general-purpose computing device which may execute in a layer the face clustering system 101 (FIG. 8), it is noted that the present invention can be implemented outside of the cloud environment.

Given a video sequence containing multiple people, the face clustering system 101 can cluster all the faces of the people as different clusters. That is, for the video sequence, the face clustering system provides where each person's face is at a given time.

The imaging device 130 inputs a list of video images with different persons faces into the face clustering system 101.

The face detection and verification device 102 extracts a face region from the original image of the video images and extracts shift features from the face region. The face detection and verification device 102 excludes items in an image that may look like a face but are not a real face of a person (e.g., a "smiley face" drawn on a wall). In other words, the face detection and verification device 102 identifies the region of an image that is in fact a face and verifies that that region is actually a face of a person. This may be done according to known methods.

The inherent supervision summarization device 103 collects two kinds of constraints: group-level supervision and instance level supervision within the same chunklet. A user inputs positive face identities for a person that the user wants the face clustering system to identify.

Figure 2:
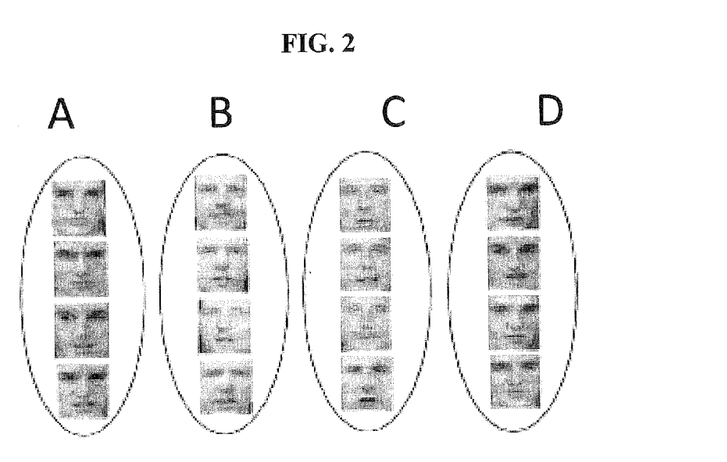
FIG. 2 exemplarily shows different facial expressions input into the face clustering system 101.
Figure 3:
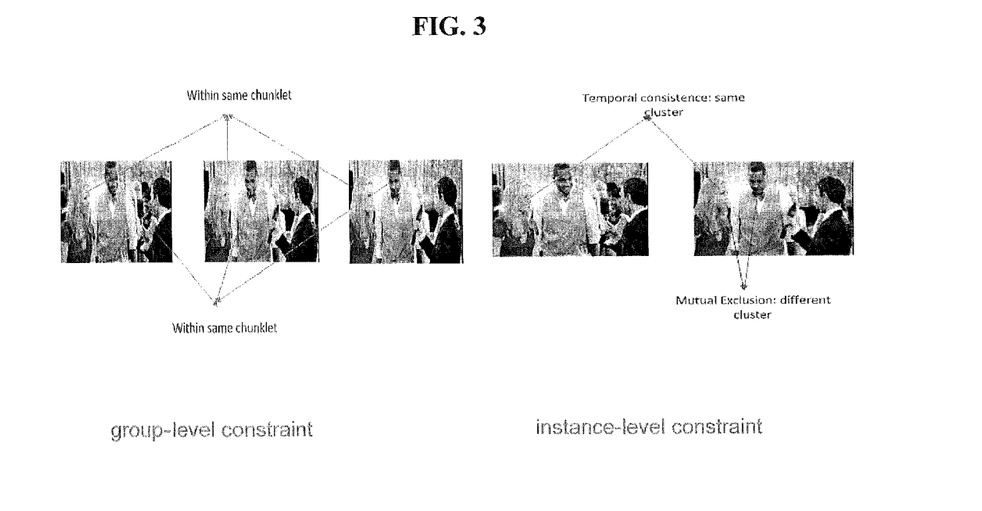
FIG. 3 exemplarily shows clustering with group-level constraint and instance-level constraint.

For example, FIG. 2 exemplarily shows four different images of a same person A, the person A having different facial expressions, lighting, and angles are input into the face clustering system 101. FIG. 2 also shows different people B, C, and D each having different facial expressions.

That is, FIG. 2 exemplarily shows that the user inputs, for example, four positive images of a face of a person for four different people (A, B, C, and D). The user identifies that one cannot link the faces of A and B, but that one must link all the faces of A together as the same person even though the images of A's face are slightly different. By providing the additional faces (such as B, C, D), the user also provides negative faces for the face clustering system to use to identify that, since the faces identified by the face detection and verification device 102 are the negative face, it is not the positive face even though it is very similar. The negative faces are the "cannot-link" faces. In other words, even though the faces may look similar, one cannot-link the faces of B with A because they are not the same person.

The inherent supervision summarization device 103 uses the negative faces as further supervision to identify the face(s) that are desired. The user assists the inherent supervision summarization device 103 by using the user input positive images to verify that a person within a chunklet is that person. In an exemplary embodiment, the user inputs to the inherent supervision summarization device 103 that a picture of A's face is given and should not look like B's face.

The discriminative projection learning device 104 estimates between chunklet and within chunklet matrix, optimizes with a Singular Value Decomposition (SVD) or eigenvalue decomposition, and learns a projection matrix.

That is, given the form of a small chunklet, each group comes from the same class but the actual class labels are not known. The discriminative projection learning device 104 discriminatively learns linear or nonlinear transformations using weakly-labeled training data and does so in a manner so as to minimize the within-chunklet scatter to keep between-chunklet not collapse to zero (e.g., the data set to not become a null value).

In an exemplary embodiment, the inventors have identified that it would be beneficial to find the transformations that minimize the within-class scatter and maximizes the between-class scatter. In other words, the inventors have improved upon traditional computational methods (i.e., Relevant Component Analysis (RCA)). Since the face clustering system does not have access to the class labels, approximation of the within-class scatter is needed.

However the "between-chunk" scatter in equation (1), below, is not a good approximation of the between-class scatter Sb ($N_{Hn}$ is the number of points in chunklet $H_n$).

$$S_{\bar{g}} = \sum_{r=1}^{R} N_r(\mu_r - \mu)(\mu_r - \mu)^T \quad (1)$$

That is, two input chunklets may contain data from the same class. In such a case, it is not reasonable to define a function like in traditional RCA and no discrimination would be possible between different classes.

In an exemplary embodiment, the inventors have recognized that the discriminative projection learning device 104 can minimize the within-chunk scatter Sg while keeping the between-chunk scatter $S_{\bar{g}}$ not collapse to zero (e.g., the data to not become a null value). A transformation W that optimize the following objective functions can be found as in equation (2) where $\omega_i$ are the columns of the transformation matrix W and this objective function can be solved via generalized Eigenvalue decomposition:

$$\hat{W} = \underset{W}{\mathrm{argmin}} |W^T S_g W| \quad (2)$$

Subject to $|W^T S_{\bar{g}} W| > 0$, and $$\|w_j\|^2 = 1 \text{ for } j = 1, \ldots, m$$

When W is obtained, the original data is projected by W (in the transformed space). This transformation is named as a chunklet learning transformation matrix. That is, the group constraints are embedded into the transformed space, and an embedding space is generated from the original image feature space.

The discriminative projection learning device 104 further optimizes with SVD or eigenvalue decomposition. More specifically, optimization and parameter estimation similarly, (labeled+constrained) and (constrained+unlabeled) data can be combined into a single objective function. In particular, the optimal model parameters can still be found by Expectation Maximization (EM), while allowing the inclusion of partially labeled as well as constrained data. The result of the minimization is a para-meter estimate that takes all the available prior information into account.

The discriminative projection learning device 104 produces a projection matrix by the aforementioned algorithms for estimating between chunk and within chunk matrix and the optimization with SVD or eigenvalue decomposition. The projection matrix is able to be used by the discriminative projection learning device 104 in other video sequences.

The clustering device 105, in the generated space, executes pair-wise based K-means clustering to cluster the video images into different clusters. That is, given few documents are related (must-link) or unrelated (cannot-link), high consistency between the partitioning and the domain knowledge is done by the clustering device 105 as shown in FIG. 4.

For example, in the below equation (3), the first term: kernel k-means objective function, the second term: reward function for satisfying must-link constraints, and the third term: penalty function for violating cannot-link constraints:

$$\zeta_{pckm} = \frac{1}{2} \sum_{x \in X} \|x_i - \mu_{l_i}\|^2 + \sum_{x_i, x_j \in M} m_{ij} + \sum_{x_i, x_j \in C} c_{ij} \quad (3)$$

Figure 4:
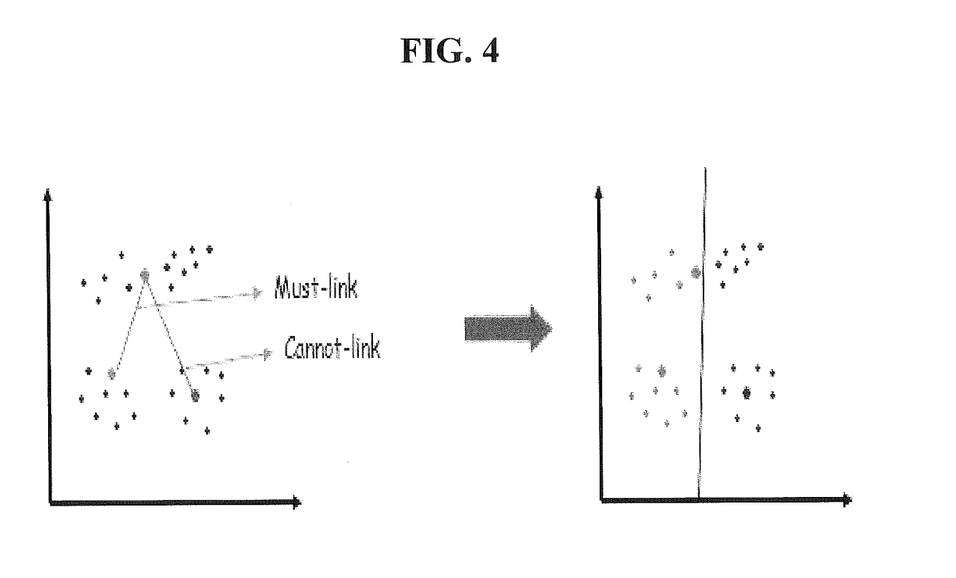
FIG. 4 exemplary shows a must-link and cannot-link by the clustering device 105 using an equation (3).

Therefore, as shown in FIG. 4, equation (3) outputs the must-link and cannot-link between the partitioning and domain knowledge so as to cluster all faces of a person together. The perpendicular line shows a separation of the must-link and cannot-link clusters.

For a given data set $\chi$, one can decompose it into three parts: unlabeled data $\chi^u$, labeled data $\chi^l$ and data with pairwise assignment constraints $\chi^c$. Such that $\chi = \chi^l \cup \chi^u \cup \chi^c$. The unlabeled data, constrained data and the labeled data can be integrated. One can define the following joint object function, which is a convex combination of $\Phi^u$, $\Phi^l$ and $\Phi^c$ in equation (4) below with $\Theta$ representing the model parameters, $\alpha, \beta, \gamma \in [0, 1]$.

$$\Theta = \underset{\Theta}{\mathrm{argmin}}(\alpha \Phi_u + \beta \Phi_l + \gamma \Phi_c) \quad (4)$$

Since $\chi^u$ and $\chi^l$ are known, the clustering device 105 calculates the integration of pairwise must-link and must-not-link constraints into the process of model fitting for data $\chi^c$.

The clustering device 105 performs integration of pairwise must-link and must-not-link constraints into the process of model fitting. Since no exact labels are prescribed for the data $\chi^c$, one considers a latent variable $y_i$ as the label for $x_i$. A binary indicator variable $a_{i,j}$ is introduced as the positive constraints (must-link), such that it is 1 if $x_i$ and $x_j$ should be in the same group, and 0 otherwise. The negative constraints (must-not-link) is defined similarly: $b_{i,j}=1$ if $x_i$ and $x_j$ should not be linked, and 0 otherwise.

The clustering device 105 penalizes (e.g., negative weighting) a constraint violation whenever the latent variables in a constraint are different (the same) while they are supposed to be the same (different). Hence, the penalty for violation of positive and negative constraints becomes $a_{i,j}1$ $(y_i \neq y_j)$, and $b_{i,j}1(y_i = y_j)$, respectively, where 1 denotes the indicator function. The clustering device 105 turns this pairwise information into a prior distribution on the label assignment for the data in $\chi_c$ by applying the maximum entropy principle: find the prior distribution $p(y) = p(y_1, \ldots, y_n)$ for the cluster labels of the data points $x_i \in \chi_c$ such that the entropy $H(p)$ is maximized while the expected number of constraint violations in equation (5):

$$\sum_{y_1=1}^{n} \ldots \sum_{y_n=1}^{n} p(y)(a_{i,j}1(y_i \neq y_j) + b_{i,j}1(y_i = y_j)) \quad (5)$$

The clustering device 105 converts the problem to the maximum entropy distribution as a Lagrangian functional with Lagrange parameters $\lambda+$ and $\lambda-$. The solution to this inference problem is the so-called Gibbs distribution, as shown in equation (6) where Z is the normalization constant:

$$\frac{1}{Z} \exp(-\lambda^+ a_{i,j}1(y_i \neq y_j) - \lambda^- b_{i,j}1(y_i = y_j)) \quad (6)$$

In order to keep the optimization tractable, the clustering device 105 approximates the posteriors in the E-step by the mean filed approximation where it is assumed that the data given in $\chi^c$ are independent. The clustering device 105 uses Bayes rule (7), where $h_i(y_i) = -\log p(x_i|y_i)$ for Gaussian class conditional densities:

$$p(y|\mathcal{X}^c) = \frac{1}{Z}\prod_i \exp(-h_i(y_i))p(y) \quad (7)$$

In the mean field approximation by the clustering device 105, the clustering device 105 finds a factorial approximation, the mean field approximation, $q(y)=\Pi_i\, q_i(y_i)$ of the posterior $p(y|\chi^c)$ such that the Kullback-Leibler divergence between the approximate and true posterior distributions is minimized as in equation (8) such that $\Sigma_v\, q_i(v)=1$, for all i:

$$\min_q \sum_y^n \frac{q(y)}{p(y|\mathcal{X}^c)} \quad (8)$$

Because the approximation is factorial, the computation of the marginalized posterior probabilities becomes feasible by the clustering device 105, a prerequisite to optimize the model efficiently. Note that the above KL divergence can be decomposed as equation (9) where H(q) denotes the entropy of the mean field approximation and $E_q$ denotes the expectation w.r.t. q:

$$-H_q - E_q p(y|\mathcal{X}^c) \quad (9)$$

$$S_b = \sum_{m=1}^M N_{\mathcal{X}_m}(\mu_{\mathcal{X}_m}-\mu)(\mu_{\mathcal{X}_m}-\mu)^T \quad (10)$$

The clustering device 105 minimizes the expression in (2) by looking for stationary points for the $q_i(v)$. Set $\gamma_{i,j}=\lambda + a_{i,j} - \lambda - b_{i,j}$ and $\Delta_{v,\mu}=1-\delta_{v,\mu}$, where $\delta_{v,\mu}$ is the Kronecker delta function. Using this convention, the exponents in equation (10), where Sb is the between class scatter, can be summarized by $\gamma_{i,j}\Delta_{v,\mu}$ if $y_i=v$ and $y_j=\mu$.

This approximation is only used for constrained data. Taking the derivative of equation (2) w.r.t $q_i(v)$ and setting it to zero leads to equation (11):

$$q_i(v) = \frac{1}{Z_i}\exp\left(-h_i(v) - \sum_{j\neq i}\sum_\mu q_i(\mu)\gamma_{i,j}\Delta_{v,\mu}\right) \quad (11)$$

where equation (12):

$$Z_i = \sum_v \exp\left(-h_i(v) - \sum_{j\neq i}\sum_\mu q_i(\mu)\gamma_{i,j}\Delta_{v,\mu}\right). \quad (12)$$

Which can be further simplified expression for $q_i(v)$ to equation (13), Since $\Delta_{v,\mu}=1$ only if $\mu\neq v$:

$$q_i(v) = \sum_v \exp\left(-h_i(v) - \sum_{j\neq i}\sum_\mu q_i(\mu)\gamma_{i,j}\Delta_{v,\mu}\right) \quad (13)$$

The clustering device 105 arrives at a factorial approximation of the marginal posterior probabilities. For the constrained data, these updated equations can be used in the E-step for posterior probability estimation. So far, every data point in $\chi_c$ participates in a constraint and the clustering device 105 minimizes the data negative log-likelihood.

Then, the clustering device 105 outputs face clusters 150. The face clusters 150 include a bunch of face clusters 150 where each cluster of the face clusters 150 contains the face image of the same person.

As a result, constraints can be automatically collected from video for face clustering, with no human efforts are required and a two-stage video face image clustering can be performed with weak supervision, which can seamlessly integrate both the pair-wise constraints and group-level constraints in one framework. It is an exemplary advantage of the claimed invention that it results in transformations that are better for class discrimination than the conventional RCA methods.

The exemplary embodiments described herein has advantages over the conventional methods such as, and not limited to, heterogeneous constraints can be employed for clustering task without human efforts, mutual exclusion information can be used for face verification, and group-level constraint can be used in video sequence clustering.

Figure 5:
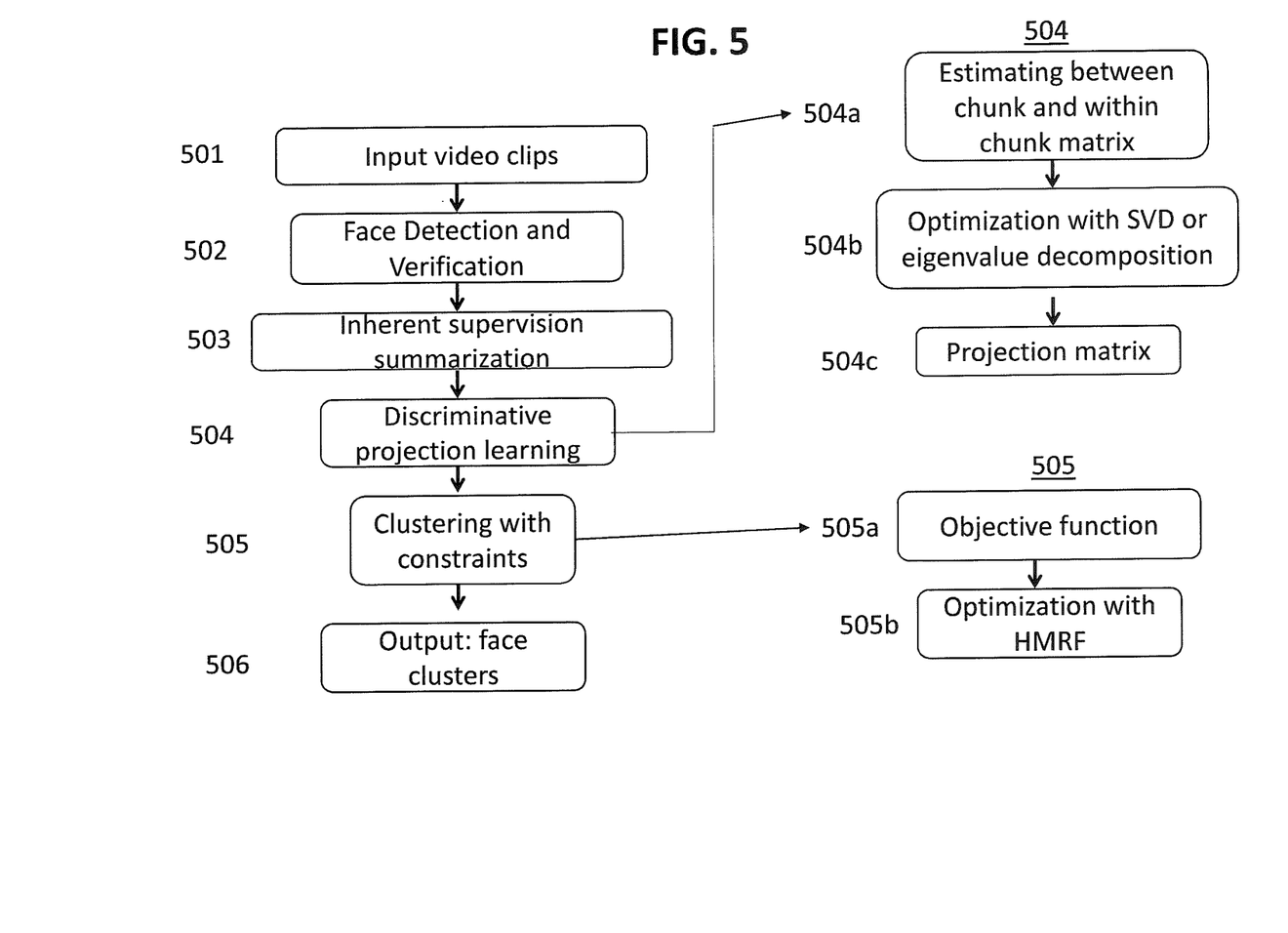
FIG. 5 exemplary shows a flowchart for a method for clustering faces in video frames.

FIG. 5 shows a high level flow chart for a method 500 for clustering faces in video frames with inherent and weak supervision.

Step 501 inputs video clips into the clustering method 500.

Step 502 performs face detection and verification by extracting a face region from the original image and extracting SHIFT feature from the face region.

Step 503 performs inherent supervision summarization by having a user input positive and negative face image pictures.

Step 504 performs discriminative projection learning by extracting two prior constraints from the video image sequence: group-constraints and pair-wise constraints.

Step 504a estimates "between chunk" and a "within-chunk" matrix.

Step 504b optimizes with SVD or eigenvalue decomposition as discussed above.

Step 504c generates a projection matrix in which the group constraints are embedded into a feature space, and generates an embedded space from the original image feature space.

Step 505 clusters the images to output face clusters 150 by executing pair-wise based K-Means clustering to cluster the video images into different clusters.

Step 505a uses the objection function in equation (2) and step 505b optimizes the objective function of equation (2) using the equations discussed above.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the face clustering system 101 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A face clustering system for video face clustering in a video sequence, the system comprising:
   an inherent supervision summarization device configured to collect group-level supervision and instance level supervision within a same chunklet based on a user input of face images for a person;
   a discriminative projection learning device configured to embed group constraints of the group-level supervision into a transformed space, and configured to generate an embedding space from the original image feature space;
   a clustering device, in the embedding space, configured to execute pair-wise based clustering to cluster the video images into different clusters with the instance level supervision collected by the inherent supervision summarization device; and
   a face detection and verification device configured to extract a face region from the video sequence and extract shift features from the face region,
   wherein the face detection and verification device excludes items in the video sequence that are not a face.

2. The face clustering system according to claim 1, wherein the discriminative projection learning device estimates a between-chunk and a within-chunk matrix.

3. The face clustering system according to claim 2, wherein the discriminative projection learning device is further configured to optimize the group constrains with Singular Value Decomposition (SVD) or eigenvalue decomposition.

4. The face clustering system according to claim 3, wherein the discriminative projection learning device produces a projection matrix based on the between-chunk and the within-chunk matrix and the optimization with SVD or eigenvalue decomposition.

5. The face clustering system according to claim 4, wherein the projection matrix is used by the discriminative projection learning device in a second video sequence.

6. The face clustering system according to claim 1, wherein the discriminative projection learning device combines labeled and constrained data and constrained unlabeled data into a single objective function.

7. The face clustering system according to claim 1, wherein the discriminative projection learning device minimizes a within-chunk scatter while keeping a between-chunk scatter not to collapse to zero such that there is a difference between the within-chunk scatter and the between-chunk-scatter.

8. The face clustering system according to claim 1, wherein the clustering device penalizes a constraint violation whenever latent variables in a constraint are different while said latent variables are supposed to be the same.

9. The face clustering system according to claim 1, wherein the clustering device outputs face clusters, the face clusters including a plurality of face clusters where each cluster of the face clusters contains the face image with the same person.

10. The face clustering system according to claim 1, wherein the face images for the person comprise a positive image of the person and a negative image of what the person does not look like.

11. The face clustering system according to claim 1, wherein the face images for the person comprise a plurality of positive images of the person and a plurality of negative images of what the person does not look like, such that the plurality of positive images comprise must-link faces embedded into the group constraints of the group-level supervision by the discriminative projection learning device and the plurality of negative images comprise cannot-link faces embedded into the group constraints of the group-level supervision by the discriminative projection learning device.

12. A face clustering method for video face clustering in a video sequence, the method comprising:
    extracting group constraints and pair-wise constraints from the video sequence;
    embedding the group constraints into a feature space while generating an embedding space from the original image feature space;
    in the generated space, executing pair-wise based clustering to cluster the video images into different clusters; and
    extracting a face region from the video sequence and shift features from the face region,
    wherein the extracting the face region excludes items in the video sequence that are not a face.

13. The method according to claim 12, wherein the executing pair-wise based clustering outputs a plurality of clusters,
    wherein each cluster of the bunch of clusters contains the face image of a same person.

14. The method according to claim 12, further comprising extracting a face region from the video sequence and extracting a shift feature from the face region,
    wherein said embedding further minimizes a within-chunk scatter while keeping a between-chunk scatter not to collapse to zero such that there is a difference between the within-chunk scatter and the between-chunk-scatter.

15. The method according to claim 12, wherein the executing pair-wise based clustering penalizes a constraint violation whenever latent variables in the constraint are different while the latent variables are supposed to be the same.

16. A non-transitory computer-readable recording medium recording a face clustering detection program for video face clustering in a video sequence, the program causing a computer to perform:
    extracting group constraints and pair-wise constraints from the video sequence;
    embedding the group constraints into a feature space while generating an embedding space from the original image feature space;
    in the generated space, executing pair-wise based clustering to cluster the video images into different clusters; and
    extracting a face region from the video sequence and shift features from the face region,
    wherein the extracting the face region excludes items in the video sequence that are not a face.

17. The non-transitory computer-readable recording medium according to claim 16, wherein the executing pairwise based clustering outputs a plurality of clusters, wherein each cluster of the bunch of clusters contains the face image of a same person.

18. The non-transitory computer-readable recording medium according to claim 16, further comprising extracting a face region from the video sequence and extracting a shift feature from the face region, wherein said embedding further minimizes a within-chunk scatter while keeping a between-chunk scatter not to collapse to zero such that there is a difference between the within-chunk scatter and the between-chunk-scatter.

19. The non-transitory computer-readable recording medium according to claim 16, wherein the executing pairwise based clustering penalizes a constraint violation whenever latent variables in the constraint are different while said latent variables are supposed to be the same.

* * * * *